United States Patent [19]

Foster et al.

[11] Patent Number: 4,798,617

[45] Date of Patent: * Jan. 17, 1989

[54] METHOD OF FORMING A PARISON IN THE MANUFACTURE OF HOLLOW ARTICLES OF GLASSWARE

[75] Inventors: Thomas V. Foster, Doncaster; Stanley P. Jones, Tickhill, both of England; David L. Alderson, Simsbury, Conn.

[73] Assignee: Emhart Industries, Inc., Farmington, Conn.

[*] Notice: The portion of the term of this patent subsequent to Jul. 28, 2004 has been disclaimed.

[21] Appl. No.: 31,072

[22] Filed: Mar. 26, 1987

Related U.S. Application Data

[63] Continuation of Ser. No. 821,636, Jan. 23, 1986, Pat. No. 4,682,996.

[30] Foreign Application Priority Data

Jan. 26, 1985 [GB] United Kingdom ............... 8501991

[51] Int. Cl.⁴ ............................................. C03B 11/12
[52] U.S. Cl. ........................................ 65/25.1; 65/76; 65/81; 65/182.2; 65/182.5
[58] Field of Search ............... 65/25.1, 76, 81, 169, 65/182.2, 182.5, 229

[56] References Cited

U.S. PATENT DOCUMENTS

| | | | |
|---|---|---|---|
| 3,258,322 | 6/1966 | Donnelly | 65/229 X |
| 4,682,996 | 7/1987 | Foster et al. | 65/25.1 |

FOREIGN PATENT DOCUMENTS

| | | | |
|---|---|---|---|
| 48-22977 | 7/1973 | Japan | 65/25.1 |
| 1305446 | 1/1973 | United Kingdom | 65/25.1 |

Primary Examiner—Arthur D. Kellogg
Attorney, Agent, or Firm—Spencer T. Smith

[57] ABSTRACT

A method for forming parisons in the manufacture of hollow articles of glassware. The method comprising forming each parison by introducing a gob of molten glass into a mould cavity (10) having the shape desired for the external surface of the parison, and moving a plunger (14,70) into the mould cavity to cause the molten glass to conform to the shape of the cavity. The method also comprises forming a layer of gas (G.98) between a surface portion of the plunger and the molten glass so that, as the plunger moves into the cavity, the glass is pushed into shape by the layer of gas, and rotating or vibrating the plunger while it is in the mould cavity.

15 Claims, 1 Drawing Sheet

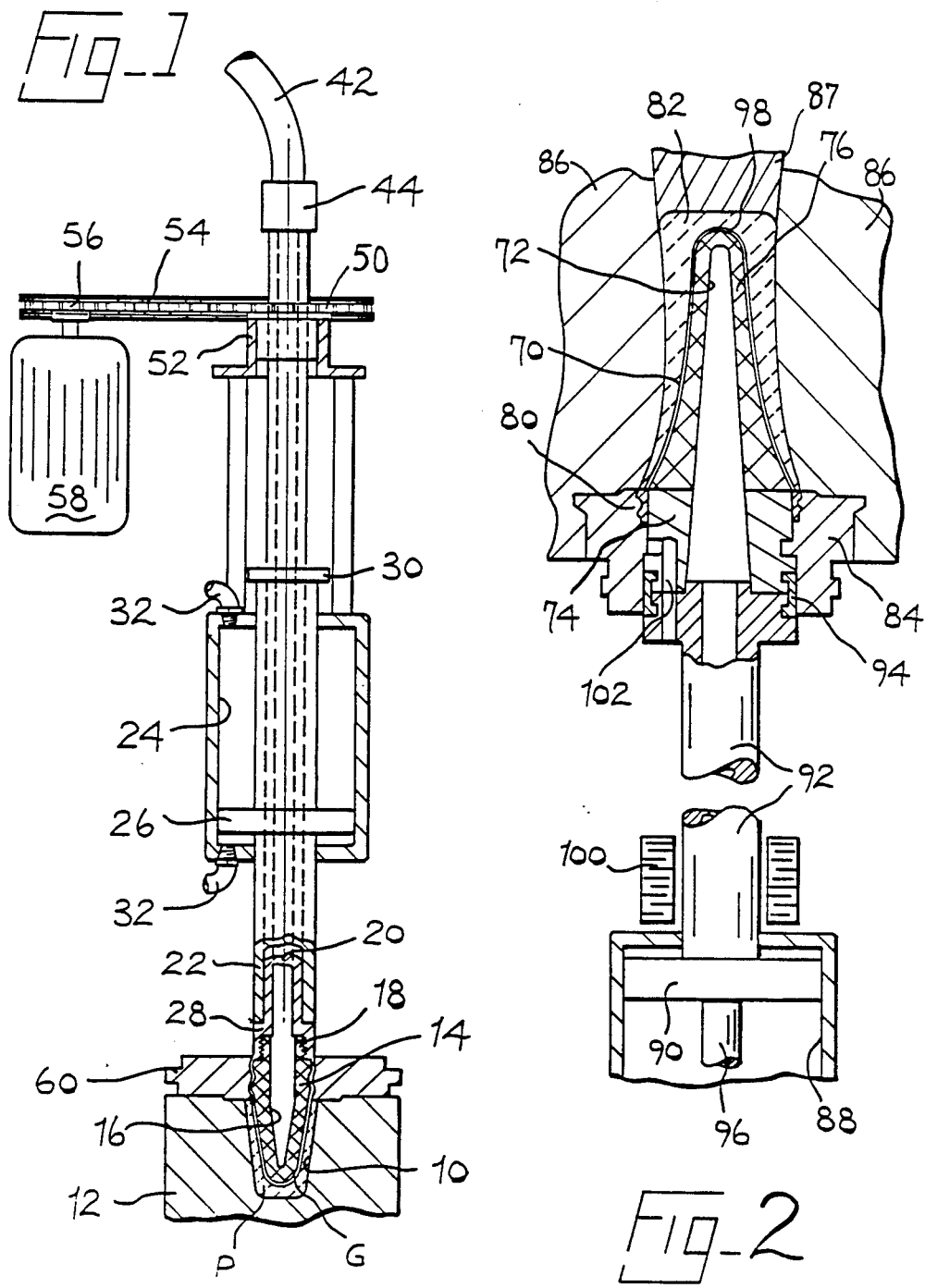

METHOD OF FORMING A PARISON IN THE MANUFACTURE OF HOLLOW ARTICLES OF GLASSWARE

This is a continuation of co-pending application Ser. No. 821,636, filed on Jan. 23, 1986, now U.S. Pat. No. 4,682,996.

BACKGROUND OF THE INVENTION

This invention is concerned with a method of forming parisons in the manufacture of hollow articles of glassware, the method comprising forming each parison by introducing a gob of molten glass into a mould cavity having the shape desired for the external surface of the parison, and moving a plunger into the mould cavity to cause the molten glass to conform to the shape of the cavity. The invention is also concerned with a plunger arrangement for use in forming parisons in the manufacture of hollow articles of glassware, the arrangement comprising a plunger, and moving means for moving the plunger into a mould cavity. The invention is also concerned with a plunger for use in such a mould arrangement.

In the formation of parisons in the manufacture of hollow articles of glassware, the parisons are formed in a "blank" mould and the parisons are then transferred to a "finish" mould in which each parison is blown to the shape of the article required. The shape of the mould cavity of the blank mould defines the external shape of the parison. The parison may be blown in the blank mould from a gob of molten glass, in which case the internal shape of the parison is not well defined or, in the well-known press and blow process of manufacturing hollow articles, the parison may be pressed by a plunger which is moved into the mould to press the glass against the mould cavity surface. In this case, the shape of the plunger defines the internal shape of the parison which is, therefore, well-defined. However, when the parison is pressed, although control of the internal shape of the parison is given, it is found that articles produced have damaged internal surfaces so that their strength, particularly their impact resistance, is reduced. It is believed that this damage is produced by contact between the surface of the plunger and the glass during the formation of the parison.

It is an object of the present invention to enable parisons to be formed with well-defined internal shape and without damage to the internal surface of the parison.

BRIEF SUMMARY OF THE INVENTION

The invention provides a method for forming parisons in the manufacture of hollow articles of glassware, the method comprising forming each parison by introducing a gob of molten glass into a mould cavity having the shape desired for the external surface of the parison, and moving a plunger into the mould cavity to cause the molten glass to conform to the shape of the cavity, wherein the method also comprises forming a layer of gas between a surface portion of the plunger and the molten glass so that, as the plunger moves into the cavity, the glass is pushed into shape by the layer of gas, and rotating or vibrating the plunger while it is in the mould cavity.

In a method according to the last preceding paragraph, the glass does not actually touch the plunger but instead is contacted by the gas which will not damage the surface of the glass while the plunger shape still defines the internal shape of the parison. The rotation or vibration of the plunger ensures that the layer of gas remains distributed over the surface of the plunger and does not form into localised pockets which would allow the glass to touch the plunger surface at some points.

The layer of gas may be formed by applying a liquid to the surface portion of the plunger which is evaporated by heat from the glass. For example, water may be applied to the plunger by spraying while the plunger is outside the mould cavity, the water evaporating to form a layer of steam. In this case, the surface portion may be porous so that more water is retained thereon. The liquid may thus be applied to the surface portion of the plunger before the plunger is moved into the mould cavity. Alternatively, the liquid may be supplied to a hollow interior of the plunger from the liquid passes to the surface portion through a porous portion of the plunger or through passages in the plunger. The liquid may, in this case, again be water which evaporates to form steam as it passes to the surface portion of the plunger.

The layer of gas may be formed by supplying gas to a hollow interior of the plunger from which the gas passes to the surface portion through a porous portion of the plunger or through passages in the plunger. In this case, the gas may be air or nitrogen which have little influence on the glass surface. However, the gas may be selected to cause an effect on the glass. For example, the gas may be arranged to form a lubricating surface on the glass or to chemically react with the glass and change the properties of the internal surface of the parison. For example, the gas may be arranged to extract sodium from the surface of the glass to thereby strengthen the surface. Possible gases include steam, sulphur dioxide and hydrochloric acid gas. The gas may also comprise a chemically inert carrier gas, for example air, in which various chemicals can be dissolved which will influence the pressing action or will react with the glass surface. For example, a chemical may be dissolved which will form a lubricating layer on the glass surface or a chemical which has the effect of dealkalising the glass surface and thereby changing its properties. Such chemicals may also be dissolved in the liquid which evaporates to form the gas when the gas is formed by evaporation.

The plunger may be rotated about a longitudinal axis thereof, while it is in the cavity, the direction of rotation being constant. Alternatively the direction of rotation may be constantly changed so that the plunger is oscillated back and forth about a longitudinal axis thereof. Another possibility is to vibrate the plunger back and forth along a longitudinal axis thereof, while the plunger is in the cavity. In this case, however, the amplitude of the vibration must be selected so that the layer of gas is not broken down and the surface of the plunger allowed to touch the glass.

The invention also provides a plunger arrangement for use in forming parisons in the manufacture of hollow articles of glassware, the arrangement comprising a plunger, moving means for moving the plunger into a mould cavity, forming means for forming a layer of gas between a surface portion of the plunger and molten glass in the mould cavity, and means for rotating or vibrating the plunger while it is in the mould cavity.

The forming means may comprise spraying means operable to spray a liquid on to the plunger while it is out of the mould cavity, the liquid being arranged to be evaporated by heat from the glass. In this case, the plunger may be arranged to have a porous surface which retains more of the liquid. The forming means may also comprise supply means operable to supply gas, or a liquid arranged to be evaporated by heat from the glass, to a hollow interior of the plunger, and the plunger may have a porous portion or define passages to allow the gas or liquid to pass to the surface portion of the plunger. As it is desirable to provide most of the gas in the tip region of the plunger so that the gas can flow down the plunger and out of the cavity, the plunger may have a porous portion having increased porosity in a tip region thereof or the plunger may define passages which are concentrated in a tip region thereof.

The arrangement may comprise means for rotating the plunger about a longitudinal axis thereof while it is in the mould cavity. Alternatively, the arrangement may comprise means for oscillating the plunger back and forth about a longitudinal axis thereof while it is in the mould cavity or for vibrating the plunger back and forth along a longitudinal axis thereof while it is in the mould cavity.

The plunger for use in a mould arrangement according to the invention may have a hollow interior to which gas or liquid can be supplied and a porous portion or passages extending in the plunger which allow the gas or liquid to pass to a external surface of the plunger. The porous portion may have increased porosity in the tip region of the plunger or the passages may be concentrated in the tip region. The hollow interior of the plunger may be formed in non-porous material which has passages therein extending to the interior of a porous surface layer of the plunger. This arrangement helps to ensure a uniform distribution of the flow of the gas through the porous part of the plunger to the surface portion thereof. In some cases, it may be necessary to provide gas escape passages in the plunger for the escape of excess gas to atmosphere.

It should be noted that, when the gas layer is formed by evaporation of liquid, a self-compensating arrangement occurs in that, should the glass surface approach the plunger, more liquid will be evaporated as more heat will reach the liquid from the glass and the pressure of the gas in the gas layer in that region will be increased so that the glass is pushed away from the plunger surface.

As the plunger surface is not touched by the plunger but is only touched by the gas layer the possibilities of damage to the internal surface of the parison are substantially reduced but, as the shape of the plunger defines the shape of the gas layer, the internal shape of the parison is well-defined.

BRIEF DESCRIPTION OF THE DRAWINGS

There now follows a detailed description, to be read with reference to the accompanying drawings, of two methods of forming parisons and two plungers arrangements for use in these methods which are illustrative of the invention. It is to be understood that the illustrative methods and plunger arrangements have been selected for description by way of example and not of limitation of the invention.

In the drawings:

FIG. 1 is a diagrammatic cross-sectional view of the first illustrative plunger arrangement; and FIG. 2 is a diagrammatic cross-sectional view of the second illustrative mould arrangement.

DETAILED DESCRIPTION OF PREFERRED EMBODIMENT OF THE INVENTION

The first illustrative mould arrangement shown in FIG. 1 is used in the first illustrative method of forming parisons in the manufacture of hollow articles of glassware. The method comprises forming each parison P by introducing a gob of molten glass into a mould cavity 10 of a mould 12, the cavity having the shape desired for the external surface of the parison P. In the first illustrative method, a plunger 14 is moved into the mould cavity 10 to cause the molten glass to conform to the shape of the cavity 10. The first illustrative mould arrangement, thus, comprises the plunger 14 and moving means for moving the plunger into the mould cavity 10. The plunger 14 is made of porous material, viz. sintered metal and has a hollow interior 16. An upper portion 18 of the plunger 14 is externally screw threaded and is threadedly received in a lower end portion of a tube 20 which extends vertically above the plunger 14. The tube 20 is slidably received in a tubular piston rod 22 of a piston and cylinder arrangement comprising a cylinder 24 and a piston 26 which is integral with the piston rod 22. The piston rod 22 engages a lower collar 28 of the tube 20 and an upper collar 30 thereof so that vertical movement of the piston rod 22, caused by the action of the piston and cylinder assembly 24 and 26, results in vertical movement of the tube 20 and therefore of the plunger 14. The piston and cylinder assembly 24 and 26 forms the moving means for moving the plunger 14 into the mould cavity 10. When air under pressure is introduced into the cylinder 24 through inlet and outlet ports 32 at the upper and lower ends of the cylinder 24, the piston 26 is caused to move up or down the cylinder 24 moving the plunger 14 into or out of the mould cavity 10.

The first illustrative method also comprises forming a layer of gas G between a surface portion of the plunger 14 and the molten glass so that, as the plunger 14 moves into the cavity 10, the glass is pushed into shape by the layer of gas G which acts as an insulator inhibiting heat transfer to the plunger. Thus, the first illustrative plunger arrangement comprises forming means for forming the layer of gas. The forming means comprises a pump (not shown) arranged to pump water through a flexible pipe 42 which is connected via a rotatable connector 44 to a upper end portion of the tube 20. The arrangement is such that the pump operates to pump water through the tube 42, the rotatable connector 44 and the tube 20 into the interior 16 of the plunger 14. The water then passes through the porous plunger 14 evaporating to form steam because of heat absorbed from the molten glass in the mould cavity 10 so that a layer of steam provides the gas layer G. In modifications of the first illustrative method, the steam may be formed before it is supplied to the tube 20 so that the pump acts to pump steam into the plunger 14. In other alternatives, other gases such as air or nitrogen or other liquids which will evaporate due to the heat of the glass may be used.

In the first illustrative method, the plunger is rotated while it is in the mould cavity 10 so as to ensure that the gas layer G covers the entire surface of the plunger 14. Thus, the first illustrative plunger arrangement comprises means for rotating the plunger 14 while it is in the mould cavity 10. The rotating means comprises a sprocket 50 mounted on a bearing 52. The tube 20 passes centrally through the sprocket 50 and can slide vertically therethrough but a key (not shown) projects from the tube 20 into the sprocket 50 so that rotation of the sprocket causes rotation of the tube. A chain 54 passes around the sprocket 50 and around a second sprocket 56 which is arranged to be driven about a vertical axis by a motor 58. The arrangement is such that operation of the motor 58 causes rotation of the sprocket 56 which causes rotation of the sprocket 50 because of the action of the chain 54. When the sprocket 50 is rotated, the tube 20 and, therefore, the plunger 14 are rotated. In the first illustrative method, the direction of rotation of the plunger 14 which is rotated about its longitudinal axis is constant but, in modifications of the first illustrative method, the motor 58 may be operated so that the sprocket 56 is oscillated back and forth about its axis so that the tube 20 is rotated back and forth and the plunger 14 is likewise rotated back and forth about its longitudinal axis.

The neck portion of the parison P is formed in a neck ring 60 which rests on top of the mould 12 in conventional manner. The neck ring 60 serves to support the parison P after formation and also carries the parison out of the mould when it has been formed.

The second illustrative method of forming parisons is similar to the first illustrative forming method but utilises the second illustrative plunger arrangement shown in FIG. 2. The second illustrative arrangement comprises a plunger 70 which as a hollow interior 72. The plunger 70 comprises a base portion 74 made of non-porous metal and a tip portion 76 which is porous being made of sintered metal. The base portion 74 is arranged to form a neck portion 80 of a parison 82. The neck portion 82 is externally formed by a neck ring 84 and the external surface of the remainder of the parison 82 is formed by a mould comprising side portions 86 and a baffle 87.

The second illustrative plunger arrangement also comprises moving means for moving the plunger 70 into a mould cavity. The moving means comprises a piston and cylinder assembly comprising a cylinder 88 and a piston 90. A tubular piston rod 92 is integral with the piston 90 and extends upwardly to the base 74 of the plunger 70. A collar 94 connects the plunger 70 to the tubular piston rod 92 so that movement of the piston rod caused by movement of the piston 90 in the cylinder 88 causes vertical movement of the plunger 70. In the second illustrative method, a gob of molten glass is introduced into a mould cavity having the shape desired for the external surface of the parison and the plunger 70 is moved into the mould cavity by operation of the piston and cylinder assembly 88 and 90 so that the molten glass is caused to conform to the shape of the cavity.

The second illustrative plunger arrangement also comprises forming means for forming a layer of gas between a surface portion of the plunger 70 and molten glass in the mould cavity. The forming means comprises a pump (not shown) operable to pump gas into a tube 96 which passes upwardly through the centre of the cylinder 88, the piston 90, and into the tubular piston rod 92 and communicates, through the piston rod, with the interior 72 of the plunger 70. In the second illustrative method, gas is pumped into the interior 72 and passes through the porous portion 76 of the plunger 70 forming a layer of gas between a surface portion of the plunger and the molten glass so that, as the plunger 70 moves into the mould cavity, the glass is pushed into shape by the layer of gas. The layer of gas is indicated by 98 in FIG. 2.

In the second illustrative method, the plunger 70 is vibrated while it is in the mould cavity. This vibration takes place along a longitudinal axis of the plunger 70, and accordingly, the second illustrative plunger arrangement comprises vibrating means operable to cause the plunger to vibrate along its longitudinal axis while it is in the mould cavity. This oscillating means is provided by an electromagnetic coil 100 which encircles the tubular piston rod 92 outside the cylinder 88. The tubular piston rod 92 is made of ferro- magnetic material so that, when an alternating electric current is applied to the coil 100, the piston rod 92, and therefore the plunger 70, is caused to vibrate back and forth along the longitudinal axis of the plunger 70.

In modifications of the second illustrative method, liquid may be supplied to the interior 72 of the plunger 70 so that the liquid passes through the porous portion 76 and evaporates due to the heat of the glass to form the gas layer 98.

The porous portion 76 of the plunger 70 does not require to be additionally cooled as the porous material and the gas layer effectively insulate the plunger from the molten glass. The non-porous portion 74 which assists in forming the neck portion 80 of the parison 82, being made of non-porous material conducts heat away from the neck portion 80 efficiently as is required. One or more gas vents 102 are provided in the portion 74 of the plunger 70 to allow the gas to exhaust to atmosphere through the space around the piston rod 92. These vents 102 communicate with the interior of the neck ring 84 or may communicate through passages in the plunger 70 with the gas layer 98.

We claim:

1. A method of forming articles of glassware comprising:
    introducing a gob of molten glass into a blank mold cavity having the shape desired for the external surface of a parison,
    inserting a plunger into the blank mold cavity to cause the gob to conform to the blank mold cavity forming a hollow parison between the plunger and the blank mold cavity,
    removing the formed parison and transferring it to a finish mold in which each parison will be blown to the shape of the required article, and
    maintaining the initial heat within the parison by providing a gaseous layer having sufficient insulation properties to limit the heat transfer from the highly heated parison to said plunger to reduce the consequent temperature drop of the parison before it is transferred to the blank mold cavity.

2. A method according to claim 1, wherein heat transfer is inhibited by establishing a layer of gas between the plunger and the molten glass parison.

3. A method of forming a glass article according to claim 2, wherein said gas is steam.

4. A method of forming a glass article according to claim 2, wherein said gas effects the surface of the parison.

5. A method of forming a glass article according to claim 4, wherein said gas is steam.

6. A method of forming a glass article according to claim 4, wherein said gas is sulphur dioxide.

7. A method of forming a glass article according to claim 4, wherein said gas is hydrochloric acid.

8. A method of forming a glass article according to claim 4, wherein said gas is an inert carrier gas in which a chemical is dissolved for reacting with the surface of the parison.

9. A method of forming a glass article according to claim 2, further comprising the step of establishing relative displacement between the parison and the plunger.

10. A method for forming articles of glassware comprising:
   introducing a gob of molten glass into a blank mold cavity having the shape desired for the external surface of a parison,
   inserting a plunger into the blank mold cavity to cause the gob to conform to the blank mold cavity forming a hollow parison between the plunger and blank mold cavity,
   establishing a layer of gas between the plunger and the molten glass parison which is reactive with the surface of the parison adjacent said blank mold to chemically change the surface of the parison surface,
   removing the formed parison and transferring it to a finish mold in which each parison will be blown to the shape of the required article.

11. A method according to claim 10, wherein said gas is steam.

12. A method according to claim 10, wherein said gas is sulphur dioxide.

13. A method according to claim 10, wherein said gas is hydrochloric acid.

14. A method according to claim 10, wherein said gas is inert gas in which a chemical is dissolved for reacting with the surface of the parison.

15. A method according to claim 10, further comprising the step of establishing relative displacement between the parison and said plunger.

* * * * *